Oct. 12, 1954     R. E. CLAPP     2,691,766

WAVEGUIDE MODE TRANSFORMER

Filed Jan. 29, 1946

*INVENTOR.*
ROGER E. CLAPP

BY

ATTORNEY

Patented Oct. 12, 1954

2,691,766

UNITED STATES PATENT OFFICE 2,691,766

WAVEGUIDE MODE TRANSFORMER

Roger E. Clapp, Cambridge, Mass., assignor, by mesne assignments, to the United States of America as represented by the Secretary of the Navy Application January 29, 1946, Serial No. 644,155

12 Claims. (Cl. 333—21)

This invention relates to wave guides in electric wave transmission systems, and more particularly to a mode transformer for such a system.

In many applications of wave guide transmission lines to electric waves, it is desirable to be able to change from a longitudinal electric field commonly known both as the $E_0$ mode of oscillation and transverse magnetic ($TM_0$) mode, to a transverse electric field commonly known both as the $H_0$ mode of oscillation and transverse electric ($TE_0$) mode. The use of the $H_0$ mode of oscillation in a circular wave guide permits the advantageous use of a mode which is very easy to transmit due to its low attenuation, but is relatively difficult to generate. The attenuation of this mode, alone of all modes, decreases as the frequency increases. Furthermore this mode of oscillation is most readily propagated through rotating joints as are commonly used in circular wave guide systems due to the symmetry of its electric field.

Heretofore, mode transformers were known in the art, but lacked certain characteristics of sturdy and simple construction.

It is accordingly an object of the present invention to provide a mode transformer of sturdy and simple construction.

A further object of this invention is to provide a mode transformer adapted to cylindrical wave guide systems.

A still further object of this invention is to provide a mode transformer for transforming a given mode of oscillation into a different mode of oscillation.

Still another object of this invention is to provide a mode transformer for converting an $E_0$ mode of oscillation to an $H_0$ mode of oscillation.

A further object of this invention is to provide a mode transformer for converting an $H_0$ mode of oscillation into an $E_0$ mode of oscillation.

A still further object of this invention is to provide a mode transformer of the class indicated which will be operable in reverse directions to transform waves of one mode existing in a first wave guide into waves of another mode in a second wave guide attached to the first wave guide.

Other objects and features of the present invention will become apparent upon a careful consideration of the following detailed description when taken together with the accompanying figures.

Figure 1:
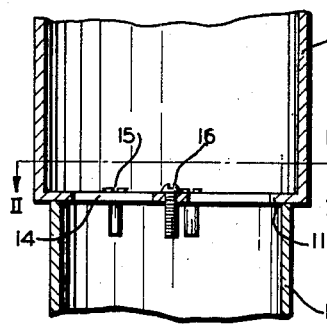
Fig. 1 is a longitudinal sectional view of an embodiment of the invention.
Figure 2:
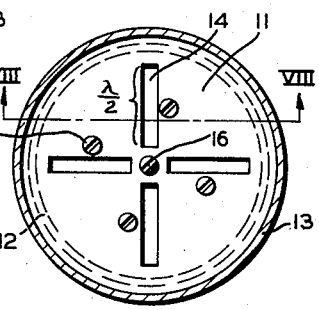
Fig. 2 is a sectional view taken along the lines II—II of Fig. 1.

Although the apparatus of this invention may be made in many forms, it is herein illustrated in Figs. 1 and 2 as a metal plate 11 installed between the adjacent ends of a circular wave guide 12 and a circular wave guide 13. The metal plate 11, extending transverse thereto, has a plurality of radially extending slots 14 in the surface thereof, the slots being somewhat less than a half wave length of the energy being propagated. Adjacent to each slot and equidistant from the ends thereof is a probe 15 extending into wave guide 12 to a depth somewhat less than a quarter wave length of the mode being propagated in the wave guide. In the center of the plate is a screw 16 threadably mounted therein and projecting into the circular wave guide 12.

Figure 3:
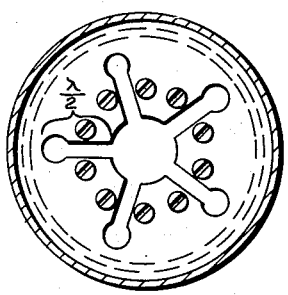
Fig. 3 is an end view of a second embodiment of this invention.

A second embodiment of the invention is shown in Fig. 3, in which probes are provided on opposite sides of each slot in order to eliminate the necessity of tuning screw 16 shown in Figs. 1 and 2. By proper matching of the difference of depth of penetration of the screws adjacent to each slot, a more favorable excitation of the slot will result. By eliminating the tuning screw of Fig. 1, the effective length of the slots as shown in Fig. 2 more nearly approaches a half wavelength of the energy being propogated providing a more efficient transformation from one mode to another.

Figure 5:
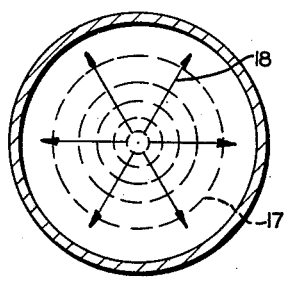
Fig. 5 is a transverse section taken along the line V—V of Fig. 4.
Figure 4:
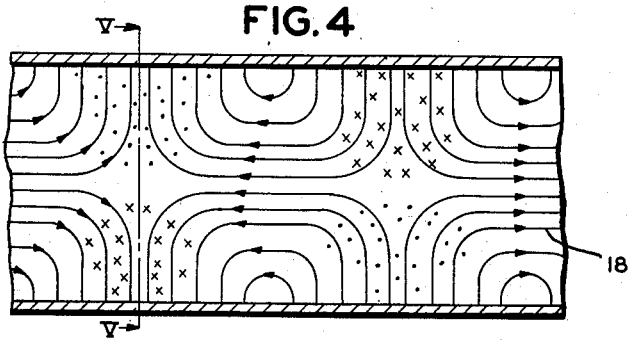
Fig. 4 is a schematic representation of a single wave length longitudinal section of a circular wave guide propogating the $E_0$ mode.
Figure 7:
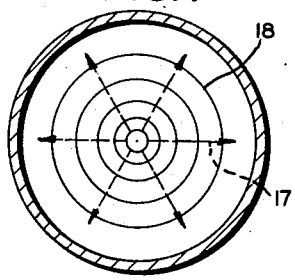
Fig. 7 is a transverse section taken along line VII—VII of Fig. 6.
Figure 6:
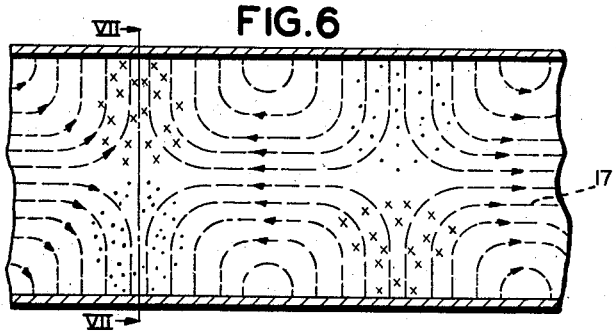
Fig. 6 is a schematic representation of a single wave length longitudinal section of a circular wave guide propogating the $H_0$ mode.
Figure 9:
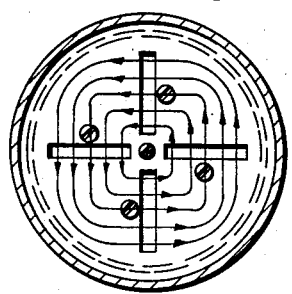
Fig. 9 is a schematic representation of the current filaments and the transverse electric lines of force existing in Fig. 2.
Figure 8:
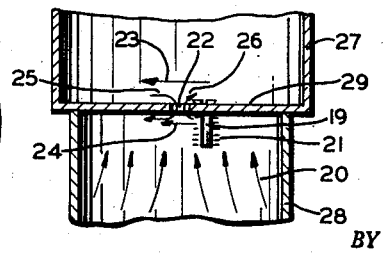
Fig. 8 is a longitudinal sectional view taken along the line VIII—VIII of Fig. 2.

The operation of this invention may be understood with reference to known modes of transmission in circular wave guides. Thus the $E_0$ mode is represented in Fig. 4 and Fig. 5, the dotted lines 17 representing the magnetic vectors and the solid lines 18 the electric vector. Likewise in Fig. 6 and Fig. 7 the $H_0$ mode propagated in a circular wave guide, is represented in similar fashion. Referring to Fig. 8, if the $E_0$ mode is brought into a lower wave guide 28, the E vector 20 will be directed substantially longitudinal to the passage of the guide. During one phase of the electric field in the lower section, the probe 19, projecting into this electric field less than ¼ wave length and thus acting as a capacitance, will collect an electric charge 21. The probe then acting as an antenna, which with its reflected image in plate 29 is effectively nearly a half wave length long, will radiate energy in all directions and will also drive current filaments radially outward from the base of the probe onto the surface of the metal plate. Thus current filament 26 will flow upward through slot 22. A balancing current filament 25 will flow downward through slot 22 on the opposite side of the slot. On the upper surface of the plate these current filaments will produce effectively the same field as a current filament 23. As a result, in the wave guide 27 above the slot, transverse electric lines of force, driven by the current filaments disclosed previously, will be propagated.

Since the slot 22 is in close approximation to the probe and the ends are approximately equidistant from the probe, the current filament passing across the upper surface of the slot will be strong and the transverse electric field will be strongly fed by energy from the slot.

During the other phase of the longitudinal electric field in the lower section, the reverse process will take place, causing currents to flow in the opposite direction across the upper surface of the slot. As a result, a transverse electric field together with its resultant longitudinal magnetic field will be propagated in the upper section in a fixed phase relationship with the longitudinal electric field and its associated transverse magnetic field propagated in the lower pipe. The transverse electric field referred to is the $H_0$ mode showing in Fig. 6, and the longitudinal electric field referred to is the $E_0$ mode shown in Fig. 4. Thus by means of a plurality of slots, together with their associated probes and the centrally mounted threaded screw for tuning out any mismatch in the $E_0$ wave guide, the $E_0$ mode is converted with very little attenuation to the $H_0$ mode.

In accordance with the reciprocity theorem, as is well known to those skilled in the art, this device likewise will convert the $H_0$ mode, if generated and subsequently propagated in the upper pipe, to the $E_0$ mode in the lower pipe.

This device has thus been shown to be able to change the $E_0$ mode for cylindrical wave guides to the $H_0$ mode for cylindrical wave guides and vice versa.

The invention described in the foregoing specification need not be limited to the details shown, which are considered to be illustrative of one form the invention may take. What I desire to secure by Letters Patent and claim is:

1. A mode transformer for electric waves comprising a first wave guide adapted to carry waves of a first mode having a longitudinal electric vector, a second wave guide adapted to carry waves of a second mode, having a transverse electric vector, joined to said first wave guide, a plate at the junction of said wave guides extending transverse thereto, said plate having a plurality of radially extending slots therein, the length of said slots being somewhat less than a half wave length of the energy being propagated and means adjacent to the mid-portion of said slots for effectively exciting said slots.

2. A mode transformer for electric waves comprising, a first wave guide adapted to carry waves of a first mode having a longitudinal electric vector, a second wave guide adapted to carry waves of a second mode, having a transverse electric vector, joined to said first wave guide, a plate at the junction of said wave guides extending transverse thereto, said plate having a plurality of radially extending slots therein, the length of said slots being slightly less than a half wave length of the energy being propagated, a probe adjacent to the mid-portion of each of said slots extending into the wave guide section conveying the mode with the longitudinal electric vector and means adjustably mounted on said plate for tuning said transformer.

3. A mode transformer comprising, a first cylindrical wave guide section, a second cylindrical wave guide section joined to said first wave guide section, a plate at the junction of said wave guide sections extending transverse thereto, said plate having a plurality of radially extending slots therein, the length of said slots being less than a half wave length of the energy being propagated, a probe adjacent to the mid-portion of each slot extending into the wave guide section conveying the mode with the longitudinal electric vector and a tuning screw threadably mounted in the center of said plate.

4. A mode transformer comprising, a first symmetrical wave guide section, a second symmetrical wave guide section joined to said first wave guide section, a plate at the junction of said wave guide sections extending transverse thereto, said plate having a plurality of centrally connected radially extending slots therein, the length of said slots being less than a half wave length of the energy being propagated, and probes adjacent to opposite sides of each slot extending into the wave guide section conveying the mode with the longitudinal electric vector.

5. Apparatus in accordance with claim 4 wherein the probes adjacent each slot are of unequal length.

6. A mode transformer for electric waves comprising, a first wave guide adapted to carry waves of a first mode having a longitudinal electric vector, a second wave guide adapted to carry waves of a second mode having a transverse electric vector joined to said first wave guide, a plate positioned transversely of said guides at the junction thereof, said plate having a plurality of radially extending slots therein, and means adjacent and equidistant from the ends of said slots for effectively exciting said slots.

7. Apparatus in accordance with claim 6 wherein the length of said slots is less than a half wave length of the energy being propagated and said last-mentioned means comprise conducting probes.

8. Apparatus in accordance with claim 6 and a tuning screw threadably mounted in the center of said plate.

9. A mode transformer comprising, a first cylindrical wave guide section, a second cylindrical wave guide section joined to said first wave guide section, a plate positioned transversely of said wave guides at the junction thereof, said plate having a plurality of radially extending slots therein, and a probe adjacent and equidistant from the ends of each slot extending into one of said wave guides.

10. A mode transformer for electric waves comprising, a first wave guide adapted to carry waves of a first mode having a longitudinal electric vector, a second wave guide adapted to carry waves of a second mode having a transverse electric vector joined to said first wave guide, a plate positioned transversely of said guides at said junction, said plate having a plurality of radially extending slots therein, the length of said slots being less than a half wave length of the energy being propagated, a probe adjacent to the mid-portion of each slot extending into the wave guide section adapted to carry the mode having the longitudinal electric vector.

11. A mode transformer for electric waves comprising, a first wave guide adapted to carry waves of a first mode having a longitudinal electric vector, a second wave guide adapted to carry waves of a second mode and a transverse electric vector joined to said first wave guide, a plate positioned transversely of said wave guides at said junction, said plate having a plurality of centrally connected radially extending slots therein, and probes adjacent to opposite sides of each slot extending into the wave guide section conveying the mode having the longitudinal electric vector.

12. Apparatus in accordance with claim 11 wherein the length of said slots is less than a half wave length of the energy being propagated.

References Cited in the file of this patent

UNITED STATES PATENTS

| Number | Name | Date |
|---|---|---|
| 2,129,712 | Southworth | Sept. 13, 1938 |
| 2,180,950 | Bowen | Nov. 21, 1939 |
| 2,197,122 | Bowen | Apr. 16, 1940 |
| 2,232,179 | King | Feb. 18, 1941 |
| 2,514,678 | Southworth | July 11, 1950 |